R. D. SNOWDEN.
DRIP POT FOR RADIATOR VALVES.
APPLICATION FILED DEC. 16, 1914.
1,198,164.
Patented Sept. 12, 1916.
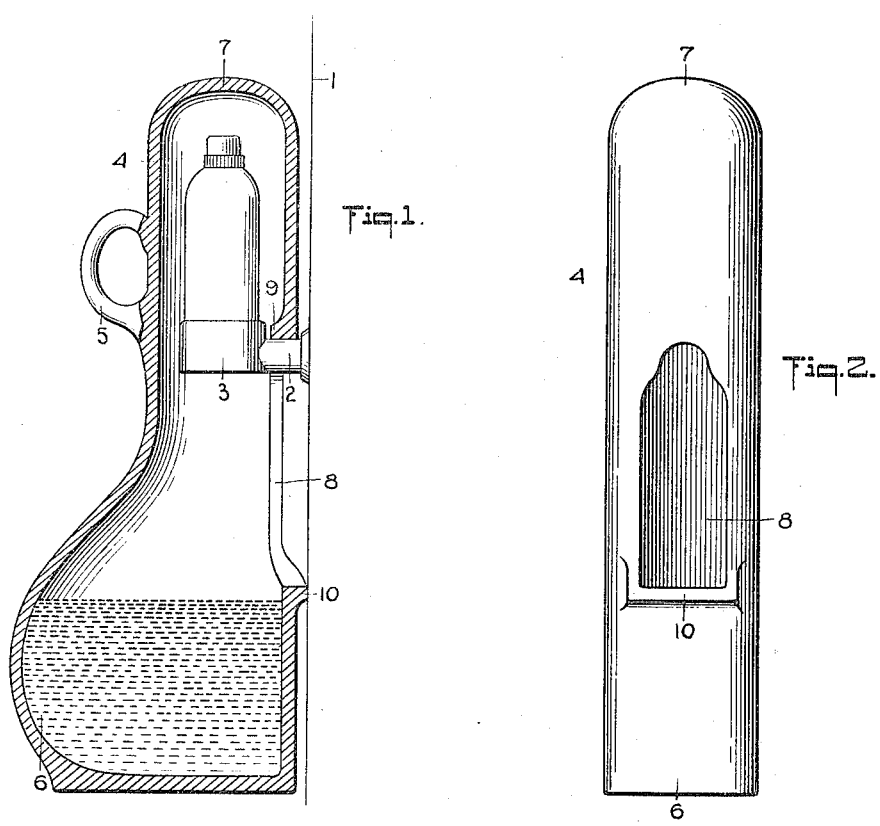
WITNESSES
INVENTOR
Richard D. Snowden
ATTORNEYS

UNITED STATES PATENT OFFICE.

RICHARD D. SNOWDEN, OF NEW YORK, N. Y.

DRIP-POT FOR RADIATOR-VALVES.

1,198,164.

Specification of Letters Patent. Patented Sept. 12, 1916.

Application filed December 16, 1914. Serial No. 877,485.

*To all whom it may concern:*

Be it known that I, RICHARD D. SNOWDEN, a citizen of the United States, and a resident of the city of New York, borough of Brooklyn, in the county of Kings and State of New York, have invented a new and Improved Drip-Pot for Radiator-Valves, of which the following is a full, clear, and exact description.

This invention relates to improvements in attachments for radiator valves, and has for an object to provide an improved construction which will catch the drip from the valve.

Another object in view is to provide a pot or receptacle readily applied and removed from a radiator valve and adapted when in position to catch the drip, and also to cause the condensation of steam, whereby none of the steam or water can splash upon the floor or adjacent walls.

In the accompanying drawings, Figure 1 is a longitudinal vertical section through a drip pot disclosing an embodiment of the invention. Fig. 2 is a front view of the drip pot shown in Fig. 1.

In heating systems where steam is used, it is necessary to provide air valves in order to permit the escape of the cold air as the radiator heats. Under some circumstances, as for instance, when the air valve is not properly regulated steam and small quantities of water are forced from the air valve. This discharge is more or less objectionable as it wets the floor and adjacent walls. In order to allow the use of the well known air valves now commonly in use and yet prevent damage by a discharge as above mentioned, a drip pot is provided, one embodiment of which is shown in the accompanying drawings.

Referring to the drawings by numerals, 1 indicates a radiator of any desired type provided with a pipe 2 to which the air valve 3 is secured. Arranged to rest on pipe 2 and inclose the air valve 3 is a pot or receptacle 4 provided with a handle 5 so that the same may be applied and removed at any time. Pot 4 is provided with a comparatively large chamber 6 at the lower part and an upper section 7 which is positioned a short distance above the top of valve 3. An opening 8 is arranged in one side of the pot 4 and is of such a size as to allow the pot to be placed in position as shown in Fig. 2. An internal flange 9 is arranged at the upper part of the opening 8 and presents a semi-circular support. The lower part of the opening 8 is provided with an external spout 10 for guiding the water when emptying the device.

In forming the device the same may be made from any desired material, as for instance metal, glass or the like. When made from glass the amount of water in the bottom 6 may be readily observed at any time, and may be emptied from time to time as desired. If desired, the device may be made in two parts, as for instance a top part of metal and a bottom part of glass.

What I claim is—

1. In a drip pot for radiator valves, a body forming a receptacle, said body being formed with an opening in one side, a supporting extension arranged at the upper part of said opening for supporting the receptacle, and means forming a discharge member arranged adjacent the lower part of the opening.

2. In a drip pot for radiator valves, a body formed with a water chamber at the bottom and with an opening in one side, a handle secured to said body for manually moving the body, an inwardly extending flange arranged at the upper part of said opening for acting as a support, and an externally arranged flange arranged at the lower part of said opening for acting as a discharge spout.

3. In a drip pot for radiator air valves, a receptacle formed with a hollow upper portion designed to receive a valve when the device is in position, a connecting portion and a water chamber at the bottom, said receptacle having an opening in said connecting portion of substantially the same length as the valve, whereby the receptacle may be placed in position by being forced directly over the valve and then lowered until the receptacle at the upper edge of said opening engages the member connecting the valve with the radiator.

4. In a drip pot for radiator air valves, a housing or casing formed with an opening intermediate the upper and lower ends and extending longitudinally of the body, said opening being of a size for permitting the introduction of the air valve through the opening without tilting the housing or casing, said body being formed with an enlargement adjacent the upper end of the opening acting as a support when the device is in use.

In testimony whereof I have signed my name to this specification in the presence of two subscribing witnesses.

RICHARD D. SNOWDEN.

Witnesses:
A. L. KITCHIN,
PHILIP D. ROLLHAUS.

Copies of this patent may be obtained for five cents each, by addressing the "Commissioner of Patents, Washington, D. C."